United States Patent [19]
Mayer

[11] Patent Number: 5,548,790
[45] Date of Patent: Aug. 20, 1996

[54] HIGH SPEED IEEE 488 BUS DATA TRANSFER SYSTEM

[75] Inventor: Sidney H. Mayer, Winchester, Mass.

[73] Assignee: Capital Equipment Corporation, Burlington, Mass.

[21] Appl. No.: 16,069

[22] Filed: Feb. 10, 1993

[51] Int. Cl.⁶ .................................................. G06F 13/00
[52] U.S. Cl. ........................ 395/855; 395/285; 395/286; 395/200.01; 364/260; 364/271.5; 364/DIG. 1
[58] Field of Search .................................. 395/325, 200, 395/275, 600, 725, 285, 286, 853, 854, 855, 200.01, 849, 280, 184.01; 370/85.1, 94.1; 340/825.5; 371/62

[56] References Cited

U.S. PATENT DOCUMENTS

| Re. 29,246 | 5/1977 | Ricci | 395/775 |
|---|---|---|---|
| 3,587,044 | 6/1971 | Jenkins | 371/62 |
| 3,810,103 | 5/1974 | Ricci | 395/575 |
| 3,982,061 | 9/1976 | Dorey et al. | 128/2 R |
| 4,070,630 | 1/1978 | Hepworth et al. | 328/63 |
| 4,186,379 | 1/1980 | Knoblock | 371/72 |
| 4,491,916 | 1/1985 | Vallhonrat | 395/325 |
| 4,621,360 | 11/1986 | Inoue | 370/85.11 |
| 4,642,758 | 2/1987 | Teng | 395/600 |
| 4,710,893 | 12/1987 | McCutcheon et al. | 395/325 |
| 5,070,443 | 12/1991 | Priem et al. | 395/725 |
| 5,103,446 | 4/1992 | Fischer | 370/85.1 |
| 5,117,423 | 5/1992 | Shepherd et al. | 370/95.1 |
| 5,297,144 | 3/1994 | Gilbert et al. | 370/95.2 |
| 5,315,706 | 5/1994 | Thomson et al. | 395/200 |
| 5,361,253 | 11/1994 | Feijen et al. | 370/17 |
| 5,361,261 | 11/1994 | Edem et al. | 370/85.3 |

Primary Examiner—Gopal C. Ray
Attorney, Agent, or Firm—Iandiorio & Teska

[57] ABSTRACT

A high speed data transfer system including a source of successive data bytes which also produces a fixed time period signal indicative of the availability of each data byte for transfer from the source after which data is no longer available for transfer; a plurality of data receivers for accepting the successive data bytes each able to produce a readiness signal indicative of the availability to receive data; and circuitry for initiating the fixed time period signal only upon the occurrence of a readiness signal from each of the receivers.

7 Claims, 5 Drawing Sheets

HIGH SPEED IEEE 488 BUS DATA TRANSFER SYSTEM

FIELD OF INVENTION

This invention relates to a high speed data transfer system wherein bytes of information are sent by a source to one or more acceptors without the need for each acceptor to signal acceptance of the information.

BACKGROUND OF INVENTION

A computer can be thought of as a bit-stream transportation system wherein groupings of binary digits are moved from place to place, undergoing the various changes necessary for a particular application. Computers and microprocessor based systems generally include a data source which generates the data to be transferred, such as an address counter and a data memory which outputs data, and data receivers or "acceptors" such as output displays, printers, encoders, numerical control devices, and the like which receive the data from the source and operate accordingly. Data transfer systems coordinate such data movement from the source to the acceptors.

Within the computer, and even within the microprocessor itself, there is a multipartite bus structure serving as a data transfer system. Data can be moved serially (bitwise) or in parallel (bytewise). Bitwise transfer proceeds one bit at a time sequentially on a single wire. Bytewise transfer is the simultaneous parallel transfer of eight bits on eight wires.

One industry standard for parallel transfer is the Institute of Electrical and Electronics Engineers (IEEE) 488.1 standard also adopted by the American National Standards Institute (ANSI) and described in the patent to Ricci (U.S. Pat. No. 3,810,103; RE 29,246). The usual IEEE-488.1 system comprises a host computer and a daisy chain of devices each with some degree of "intelligence". Thus, with a single input/output port, a computer can host a full complement of peripherals: disk drives, printers, plotters, and laboratory instruments. To keep things organized, each device has its own "address" for each of its capabilities and responds accordingly when thus addressed. All of the devices can be addressed more or less simultaneously, the operations being handled by an interface manager in the IEEE 488.1 bus. The IEEE 488.1 bus consists of eight bidirectional data lines, five bus management lines, and three handshaking lines. The handshaking lines accept control signals that establish agreement between two components so that each can communicate with the other. In practical terms, the handshaking signals indicate that one component is ready to receive data while the other is ready to send data. The goal is to send data to the receivers only when they are ready to accept data and are not "busy" or otherwise incapable of receiving data. A corollary goal is to assure each receiver has accepted the data sent by the source.

Hence, the prior art handshake process includes the use of three control signals, by 5 convention termed "data-valid" (DAV), "ready for data" (RFD) and "data accepted" (DAC).

Also by convention, the source generates a low DAV signal when data on the lines is available, valid, and may be accepted by the receivers. The source generates a high DAV signal when data is removed or otherwise no longer valid.

The receivers generate a high RFD signal only when all the receivers are ready to accept data, and a low RFD signal when at least one receiver is not ready to accept data (i.e. one receiver is 'busy'. The receivers also generate a high DAC signal when all data is accepted from the source, and a low DAC signal when all data has not yet been accepted from the source.

The prior art recognized that data receivers or acceptors such as output displays, printers, encoders, and the like generally have different response times to applied data signals and that such acceptors may also require different periods of operation before being ready again to respond to newly applied data signals. Because the prior art process is designed to facilitate multiple simultaneous acceptors or receivers, however, and wait as long as required for all the receivers to complete each handshake step, the low to high transitions of the RFD and DAC signals between each successive byte of information are accomplished with passive "pullup" circuitry. This allows any acceptor to keep these signals at a low voltage level with an active driver circuit, even if the other acceptors have enabled their passive pullup circuits. However, because passive pullups are used to drive the RFD and DAC signals high, the time for the low to high voltage transition is determined by RC time constant introduced by pullup resistance and the capacitance of the cable. The time required to achieve all the signal transitions is the major limiting factor in system speed.

Hence, the normal IEEE 488.1 basic data transfer rate is 0.25 megabytes/second. This rate may be increased to 1 or 1.5 megabytes/second by following certain cabling and electrical restrictions outlined in section 5.2 of the IEEE standard. Since, however, the three wire handshake sequence repeats for every data byte transfer, the key speed limiting steps are where the receiver handshake signals go from a low to a high logic level. The receivers drive the signals actively low, but allow the signals to go high by removing the active low drive and letting pullup resistors bring up the voltage. This method, called "wire-OR", requires the handshake RFD signal be driven low between each byte transferred and remain low until all the receivers are again ready for data transmission. After the transmission of one byte, RFD is allowed to be pulled high. Similarly, DAC is driven low when DAV is high and not allowed to go high until each receiver has completed accepting data. The time for the low to high voltage transmission on the RFD and DAC signals is determined by the number of devices in the system and the total cable length. The IEEE 488.1 specified cable has a significant capacitance that must be charged by the pullup resistors in the IEEE interfaces of the devices. In the best case, with short cables and very fast logic in the IEEE 488.1 interfaces, the three wire handshake (RFD, DAC, DAV) still limits the data transfer rate to around 1.5 megabytes/second. The IEEE 488.1 standard refers to a "nominal rate" of 1.0 megabytes/second which is the physical limit for a full system with 15 meters of cable.

Therefore, the IEEE 488.1 handshake process allows arbitrarily slow devices and multiple listeners operating at different speeds to delay successive data byte transfer but at the cost of limiting the maximum possible speed. Until now, this has been a "speed barrier," perceived as a fundamental part of IEEE 488.1 systems, much as the sound barrier was thought at one time to be an absolute limit to flight speed.

In some cases, the designers of such devices have provided auxiliary data output interfaces of a proprietary custom design to achieve higher speeds, but such interfaces suffer from the need to build custom hardware to interconnect these devices.

SUMMARY OF THE INVENTION

It is therefore an object of this invention to provide a high speed data transfer system and method.

It is a further object of this invention to provide such a high speed data transfer system and method which eliminates the need for unnecessary signal transitions between each transfer of successive data bytes.

It is a further object of this invention to provide such a high speed data transfer system and method which still allows receivers to indicate they are busy or otherwise not ready for more data.

It is a further object of this invention to provide such a high speed data transfer system and method in which the handshake process continues to generate source data until a transition in the control signal received from at least one receiver occurs thereby eliminating the delay associated with waiting for a transition on each byte and increasing the possible maximum data rate.

It is a further object of this invention to provide such a high speed data transfer system and method which is compatible with existing systems and devices.

It is a further object of this invention to provide such a high speed data transfer system and method which eliminates the need for parallel input/output ports or direct memory access ports on instruments.

This invention results from the realization that a faster data transfer system and method can be accomplished by a handshake procedure which, instead of requiring receiver controlled high to low and low to high signal transitions for each data byte transferred from the source, allows the source to continuously place successive data bytes on the line for a fixed period of time within which the receivers are guaranteed by design to accept the current data byte present on the line, and yet still allows any one receiver to signal that it cannot accept the next data byte and only then undergoing a receiver controlled signal transition; and the further realization that such a system no longer requires the receivers to signal both that they are ready for more data and that they have accepted the current data byte thereby eliminating the waiting period for passive, pull-up circuitry to bring the receiver controlled signals high after the transfer of each data byte.

This invention features a high speed data transfer system comprising source means of successive data bytes and means to produce a fixed time period signal indicative of the availability of each said data byte for transfer from the source after which data is no longer available for transfer; a plurality of receiver means for accepting the successive data bytes each including means to produce a readiness signal indicative of the availability to receive data; and means for initiating the fixed time period signal only upon the occurrence of a readiness signal from each of the receiver means.

There is a source means for sending successive data bytes; a plurality of data receivers; and means for coupling data signals from the source means to each of the data receivers; means for producing a series of fixed time period signals indicating to said data receivers the presence of a data byte for transfer; means coupled with each of the data receivers for signaling the inability to accept the next data byte within the duration of the fixed time period; and means, responsive to the means for signaling, for delaying the production of a successive fixed time period signal until each data receiver is ready to accept a successive data byte.

This invention also features a high speed data transfer process for transferring data signals from a source to a plurality of data receivers each of which is able to receive applied data signals in response to a control signal indicating its preparedness to receive such data signals comprising providing a signal indicating data is available only after all the receivers indicate their preparedness to receive data; terminating the signal at the expiration of a fixed time period; and activating the source to supply successive data signals in common to all of the receivers during each fixed time period when the signal indicating data is available is present.

This invention also features a high speed data transfer system for transferring data signals from a source to a plurality of receivers each of which include means for operating on the data signals from the source comprising means for coupling data signals from the source to each data receiver; means to produce a fixed time period signal indicating the availability of a data signal from the source, the time period being longer than the maximum time period for each receiver to accept data signals from the source; means for transmitting, to the source, a signal from a receiver indicative of the inability to accept a transferred signal from the source; and means for delaying the production of the fixed time period signal in response to a signal transmitted from a receiver.

Also featured is a high speed data transfer system for transferring data signals from a source to a plurality of receivers each including means for operating upon the data signals from the source comprising means, responsive to the data signal supplied from the source, for indicating for a fixed period of time that data is available on the system for transfer from the source and thereafter for indicating that data is not available on the system for transfer from the source; means responsive to each receiver, for indicating the inability of a receiver to accept a data signal from the source, and for indicating the ability of each receiver to accept a data signal from the source; and means for delaying the means for indicating that data is available on the system from the source in response to the means for indicating the inability of a receiver to accept a data signal from the source until each receiver is able to accept a data signal from the source.

There may be source means of data signals including means for storing data signals to be transferred, a plurality of data receivers for operating on applied data signals from the source including means to produce a first output indication of the operability thereof on applied data signals and means for providing a second output indication of the inoperability thereof on applied data signals, means for coupling data signals from the source means to each of said data receivers; means for producing a third output indication, for a fixed period of time, of the availability of data signals from the source; and means for delaying the means for producing a third output indication, upon the appearance of the second output indication until the appearance of said first output indication. The fixed period of time may be a function of the time required for a data receiver to provide the second output indication of the inoperability thereof on applied data signals.

A high speed data transfer system for a source which transfers successive data bytes and receiver means which accept the data bytes include means for indicating to the receiver means a data available signal having two states, a first state indicating the presence of a data byte for transfer from the source, and a second state indicating the unavailability of a data byte for transfer from the source; means for indicating to the source a request for data signal having two states, a first state indicating the ability to accept a data byte from the source, and a second state indicating the inability to accept a data byte from the source including means for changing from the first state to the second state within a first time period; logic means for placing the data available signal in the first state indicating the presence of a data byte for transfer from the source for a second time period greater than the first time period; and wherein the logic means is adapted to receive the request for data signal, and upon receipt of a request for data signal in the second state, for holding the data available signal in the second state until the receipt of a said request for data signal in the first state. The logic means may include delay means for holding the data available signal in the first state for the second time period.

Finally, this invention features a high speed data transfer process for transferring data signals from a source to a plurality of receivers each including means for operating upon said data signals from the source comprising the steps of providing data signals from a source means to a plurality of data receivers for operating on the applied data signals from the source; producing a first output indication of the operability thereof of said data receivers on applied data signals from the source and providing a second output indication of the inoperability thereof on applied data signals if a said receiver cannot accept additional data signals; coupling data signals from the source means to each of the data receivers; producing a third output indication, for a fixed period of time, of the availability of data signals from the source; and delaying the production of the third output indication, upon the appearance of the second output indication until the appearance of the first output indication. The data available signal may have two states, a first state indicating the presence of a data byte for transfer from the source, and a second state indicating the unavailability of a data byte for transfer from the source. The request for data signal may also have two states: a first state indicating the ability to accept a data byte from the source, and a second state indicating the inability to accept a data byte from the source wherein changing from the first state to the second state occurs within a first time period. The data available signal is placed in the first state indicating the presence of a data byte for transfer from the source for a second time period greater than the first time period, and the data available signal is held in the second state upon receipt of a request for a data signal in the second state until a receipt of a request for a data signal in the first state.

DISCLOSURE OF PREFERRED EMBODIMENT

Other objects, features and advantages will occur to those skilled in the art from the following description of a preferred embodiment and the accompanying drawings, in which.

Figure 1:
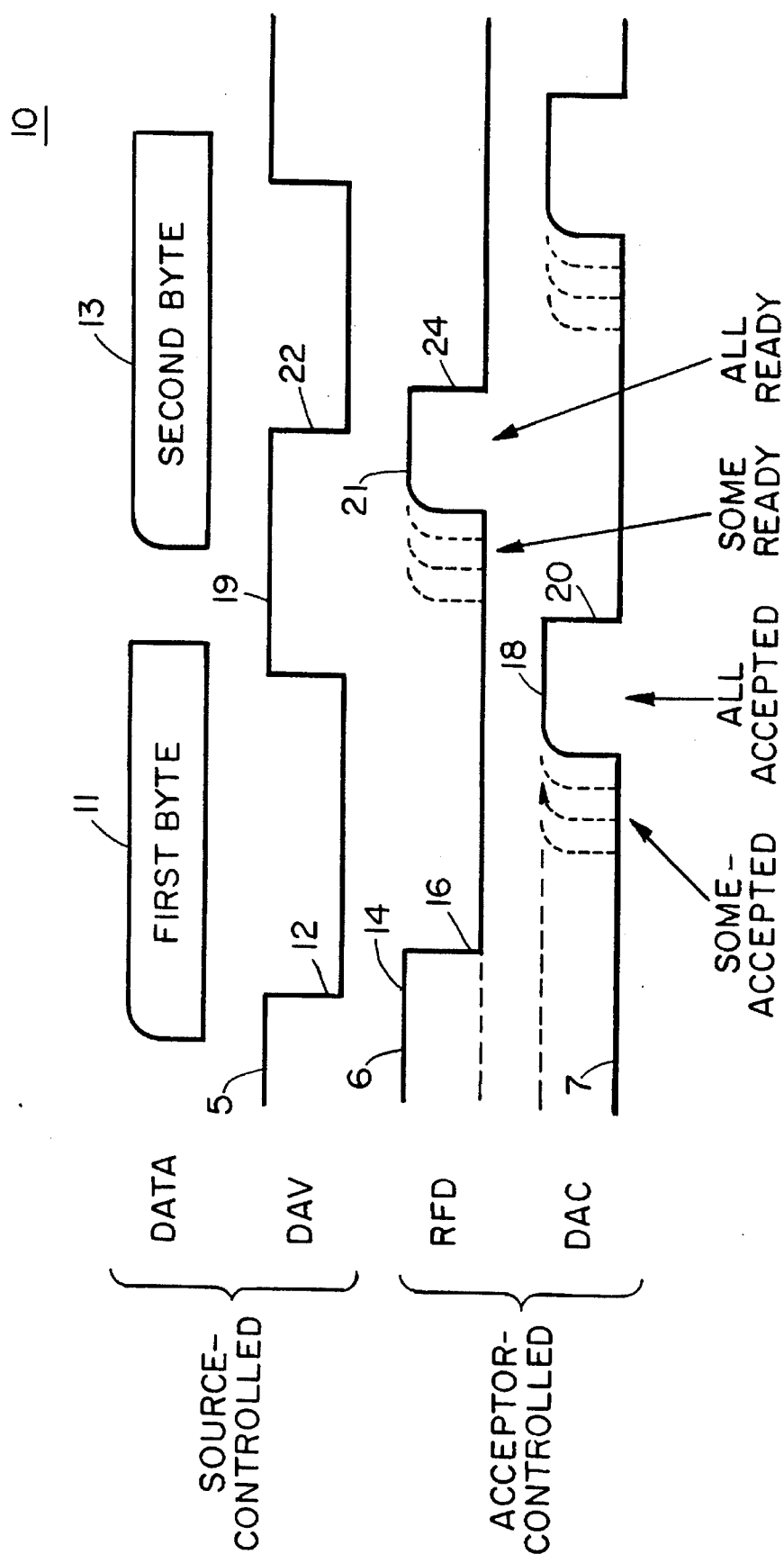
FIG. 1 is a graph showing the interaction as a function of time between a data source and data acceptors according to a prior art data transfer control apparatus.

According to the prior art methodology and apparatus, 10, FIG. 1, the handshake process utilizes three signals DAV 5, RFD 6, and DAC, 7. At initialization, DAV 5 is high (data available), RFD 6 is high (ready for data) and DAC 7 is low (all data not accepted). After first byte 11 is placed on the data signal lines, DAV is set low as shown at 12.

When all data receivers are ready for data as shown at 14, (RFD high), and they determine the data is valid as shown at 12, they then accept the data and also drive RFD low as shown at 16.

After each acceptor has completed accepting data, the DAC signal is allowed to go high as shown at 18. At this time, the source sets DAV high as shown at 19. DAC is driven low as shown at 20 and thereafter RFD is allowed to be pulled high as shown at 21. Second data byte 13 is then placed on the line and DAV is driven low by the source as shown at 22. Again RFD is driven low as shown at 24.

Hence, according to prior art technology, the request for data (RFD) transition, between a high state, and a low state occurs on each cycle of generating new data on the source line irrespective of whether there truly was a full memory, or the like which would render one receiver unavailable to receive data. And, a data accepted transition (DAC) from low to high must be sent by the receiver to the source before the source can generate new data. Hence, each data byte transferred according to this process requires both the RFD and DAC signals to go through a complete cycle of both high to low and low to high voltage transitions. Because the process is designed to allow multiple simultaneous receivers, the wait for all receivers to complete each handshake step (and therefore the low to high transitions of RFD and DAC) is accomplished with passive "pullup circuitry." This allows any one acceptor to keep these signals at a low voltage level with an active driver circuit, even if the other acceptors have enabled their passive pullup circuits. However, because passive pullups are used, the time for the low to high voltage transition is determined by RC time constant introduced by pull-up resistance and the capacitance of the cable. Hence, the time required to achieve all the signal transitions is the major limiting factor in system speed.

Figure 2:
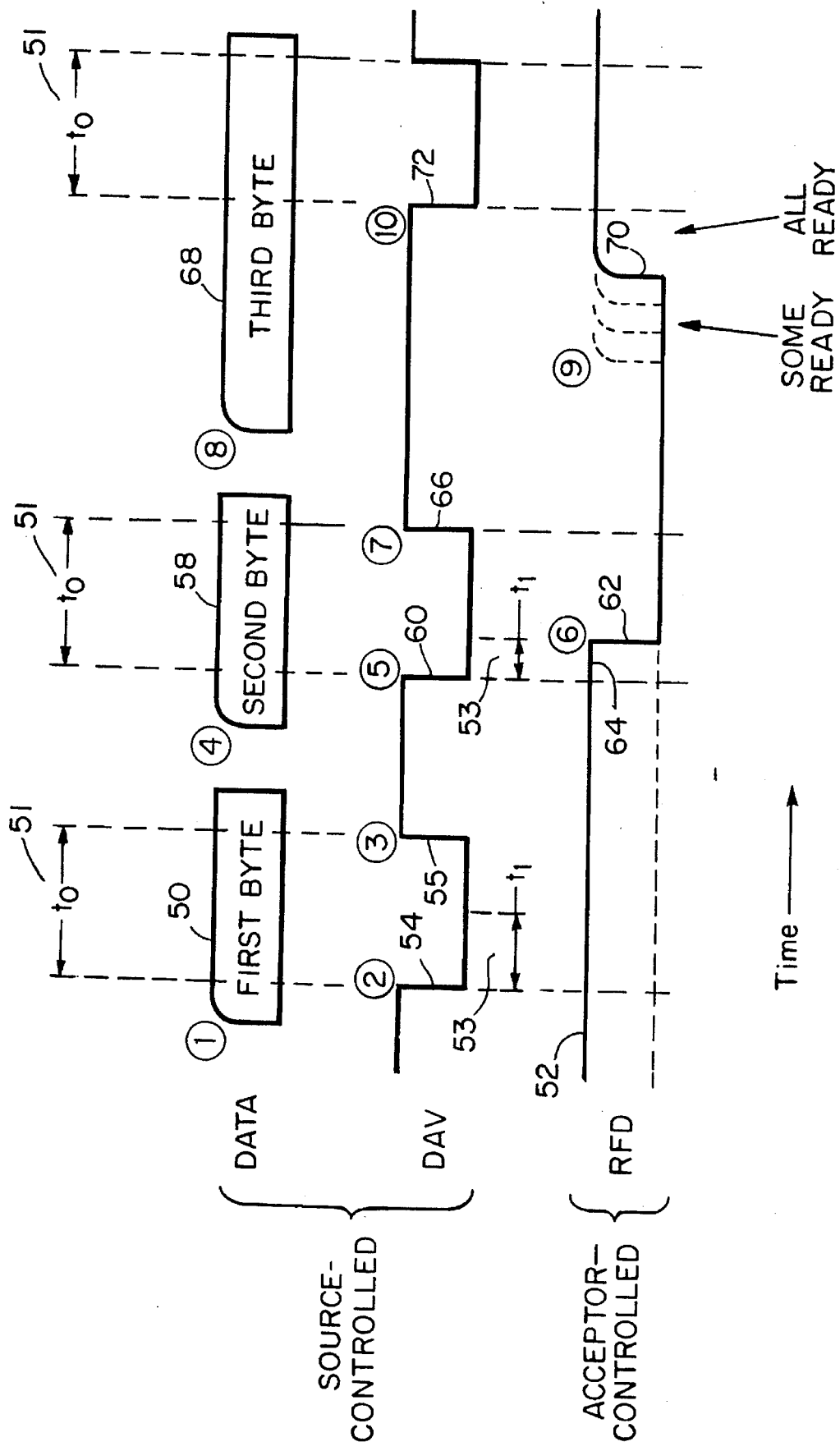
FIG. 2 is a graph showing the interaction as a function of time between a data source and data acceptors according to the system of the present invention.

In this invention, however, the source places a new data value on the data signal lines, first byte 50, FIG. 2. When RFD for each receiver indicates ready for data as shown by high signal 52, the source sets DAV low as shown at 54 for a fixed period of time $t_0$ 51. The receivers are required to complete acceptance within a time period, $t_1$, 53 shorter than the minimum allowed DAV time period, $t_o$, 51. At the expiration of time $t_o$, the source drives DAV high as shown at 55 indicating the "first byte" 50 is no longer available for transfer. Note RFD was not driven low and thus a DAC signal is not required. This feature is further discussed below.

Next, the source places second byte 58 on the data signal lines. Again the source drives DAV low as shown at 60 for the preestablished time period, $t_o$ 51. Note that in between successive data bytes "first byte" 50, and "second byte" 58, RFD was not set from high to low and then again from low to high according to the prior art methodology. The second data byte is still accepted by all acceptors within the required time period $t_1$, 53 while RFD is true as shown at 64 even though one or more receivers cause RFD to go low as shown at 62 indicating at least one receiver is busy and now not able to accept further data, such as third byte 68.

This is accomplished by requiring that any RFD transition from high to low as shown at 62 by the receivers must occur within a time period $t_1$, 53 shorter than the minimum allowed time period $t_0$ 51 wherein DAV is set low indicating data is available for acceptance. Although RFD is now low because one or more acceptors are busy, third data byte 68 is still placed on the data signal lines. However, the source cannot set DAV low until the RFD signal from the receivers is allowed to go high as shown at 70. When each receiver becomes ready for more data, the source responds to RFD high at 70 by driving DAV low again as shown at 72 for the time period $t_o$, 51.

Hence, a transition in the RFD signal is not required for each transfer cycle. Moreover, a DAC signal, in addition to DAV and RFD signals is not required at all. When receivers remain ready for data throughout multiple transfer cycles, those cycles are completed much more quickly than with the prior art method of FIG. 1. The time delay introduced by the RC time constant when RFD is pulled high now only occurs when one receiver must slow down the source as shown at 70, FIG. 2.

In this way, the data source is allowed to send multiple data bytes in a "burst" without a return signal transition from the acceptors. Instead, the source uses a fixed time period $t_0$ 51 for driving the DAV signal low chosen to account for the worst case cabling characteristics based on electrical characteristics of present IEEE 488.1 cable and drivers.

The RFD signal from the acceptor to the source, when low, indicates that the acceptor has become busy upon arrival of the current data byte, and that the source should not send any additional data bytes until all acceptors again become ready. It is therefore essential that the RFD signal go to a low level before the source is ready to send the next data byte. For this reason, time period $t_1$ 53, is constrained to be less than time period $t_0$, 51.

In a practical implementation of this invention, allowance must be made for transmission delays in the cable and logic circuits. Also, a finite time delay $t_2$, 59 FIG. 2, must be introduced for DAV to remain high, even in the case where RFD remains high.

The timing constraint may be restated to account for realistic cable delays to require that time period $t_1$, 53 plus cable delays between the acceptor and the source be less than time periods $t_0$, 51 plus $t_2$, 59. Also, since acceptors accept, or latch the data within time period $t_1$, $t_1$ must be less than $t_0$.

In implementing this invention, time period $t_1$, 53 would commonly be chosen to allow easy implementation of acceptor logic using inexpensive circuitry. A typical value for $t_1$ might be 80 nsec.

Once a value is chosen for $t_1$, 53, values may be chosen for $t_0$, 51, and $t_2$, 59. The handshake mechanism of this invention requires only that $t_1$ be less than the sum of $t_0$ and $t_2$. However, a practical implementation will typically place new data on the data signal lines at the beginning of period $t_2$. The data signals will take some period of time to settle to valid logic levels on the cable, and $t_2$ should be chosen to be longer than this settling period.

One good strategy for choosing time periods $t_0$, 51, and $t_2$, 59, is to base them on the total cable length of the system being implemented, choosing $t_2$ based on data settling times, and keeping $t_0$ constant (and larger than $t_1$). A typical value for $t_0$ might be 100 nsec. Typical values for $t_2$ would vary from 100 nsec to 350 nsec depending on the maximum cable length desired.

For example, Table 1, below, shows how the time period $t_0$, 51, plus $t_2$, 59, can be set for corresponding cable configurations and lengths:

TABLE 1

| Cable length (meters) | $t_0 + t_2$ (nsec) | Maximum data rate (megabytes/sec) |
|---|---|---|
| 1 | 200 | 5.0 |
| 2 | 220 | 4.5 |
| 4 | 250 | 4.0 |
| 6 | 300 | 3.3 |
| 8 | 325 | 3.0 |
| 10 | 350 | 2.8 |
| 15 | 450 | 2.0 |

Figure 3:
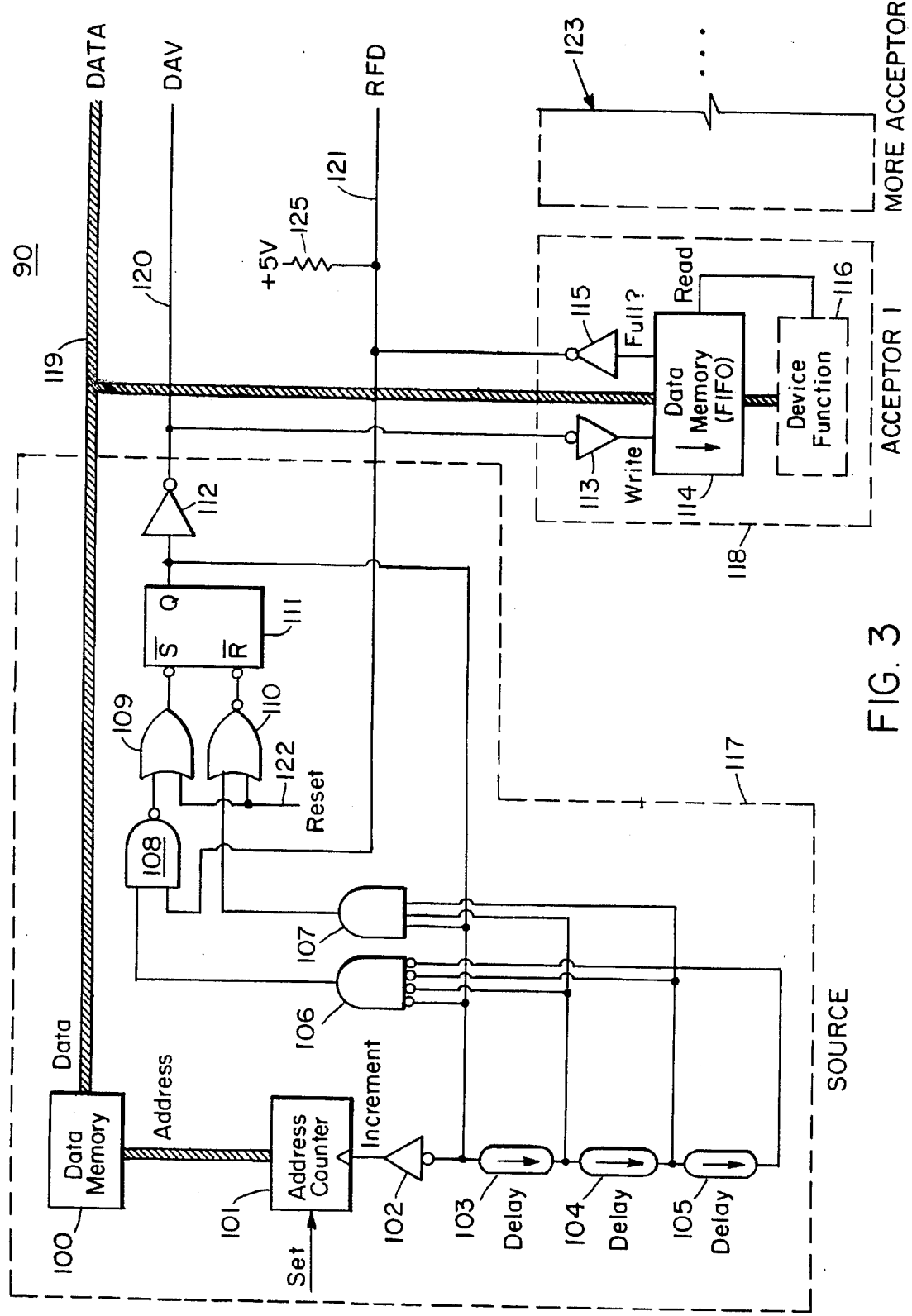
FIG. 3 is a schematic diagram of one embodiment of the high speed data transfer system according to the present invention.

This invention may be implemented in system 90, FIG. 3 wherein data source 117 includes data memory 100 containing information to be transferred to data acceptors 118, 123, etc. over data lines 119. Data memory 100 outputs data based on its address input provided by address counter 101. The combination of data memory 100 and address counter 101 allows a series of data bytes to be sourced onto data signal lines 119. Reset signals 122, 124 may be used to initialize the source and reset signal 124 sets the address counter to its initial value. Flip flop 111 stores the current value of the data available (DAV) signal 120 (inverted). Inverting driver 112 converts the inverted DAV signal (output Q of flip flop 111) to the non-inverted DAV signal 120. When reset signal 122 is asserted, or gate 109 forces the set (S) input of flip flop 111 to go to a high logic state, and the not-OR gate 110 forces the reset (R) input of flip flop 111 to the low logic state resulting in flip flop 111 becoming reset, with output Q low (false). Thus, the DAV signal is initially high. When reset signal 122 has been asserted for a sufficiently long period of time, the delay lines 103, 104, and 105 have all stabilized and their outputs are equal to the Q output of flip flop 111. AND gate 106 output then becomes high while AND gate 107 output becomes low.

When the reset signal is removed, and RFD signal 121 becomes true (due to pull-up resistor 125), NOT-AND gate 108 outputs becomes low, and OR gate 109 output becomes low asserting the set(S) input of flip-flop 111 causing Q to become high, and DAV signal 120 to become low indicating that a valid data byte is present on the data transfer bus. As soon as the Q output becomes high, gate 106 output becomes low which causes gate 108 output to become high, and gate 109 output to become high removing the set(S) input to flip-flop 111.

DAV low, inverted by gate 113, causes the current data byte to be stored in data byte memory 114 within data acceptors 118, 123, etc.

When flip-flop 111 output goes high (DAV becomes true), the delay components begin changing states. After delay 103 and 104, all three inputs to gate 107 become high, gate 107 output becomes high, and gate 110 output becomes low, asserting the reset (R) input of flip-flop 111. At this time, flip-flop 111 resets, and its Q output becomes low, changing DAV to false (high). Thus, the period of time that DAV remains true ($t_0$ 51, FIG. 2) is governed by delay elements 103 and 104. As soon as the Q output of flip-flop 111 becomes low, gate 107 output becomes low, and gate 110 output becomes high, removing the reset input to flip-flop 111. Flip-flop 111 Q output becomes low and DAV goes false at the end of the data byte transfer and causes the output of inverter 102 to become high, incrementing address counter 101 and causing data memory 100 to access the next data byte and place it on data bus 119.

After DAV has been false (and flip-flop 111's Q output low) for the combination of delay periods 103, 104, and 105, all the inputs to gate 106 become low. Then, gate 106 output becomes high, and as long as RFD remains high, gate 108 output becomes low, and gate 109 output becomes low asserting the set input of flip-flop 111 again. The period of time that DAV remains false ($t_2$) is governed by logic delay elements 103, 104, and 105. This cycle repeats itself, alternating DAV true and false for periods governed by delay elements 103,104, and 105, and transferring a sequence of data bytes to the acceptors 118, 123, etc.

Within an acceptor, such as acceptor 118, a device function block 116 reads data from memory 114 and processes the data. If the data arrives from the source taster than it is processed in the acceptor, data memory 114 may become full. Memory 114 becomes full at the time a write operation occurs which is when DAV becomes true (low). When this happens, gate 115 brings RFD signal 121 low. After DAV has been true for the chosen period (delay 103 plus delay 104) and then false for the chosen period (delay 103 plus 104 plus 105), gate 106 output becomes high, as described above. However, if RFD signal 12 1 is low, gate 108 output remains high, and flip-flop 111 is not set, so that DAV remains false (high).

When data memory 114 within acceptor 118 is no longer flail, gate 115 no longer holds RFD low, and pullup resistor 125 returns RFD signal 121 to a high state. At this time, gate 108 output becomes low, gate 109 output becomes low, and flip-flop 111 is set, causing DAV to become true again and the data source cycle repeats.

Therefore, as long as data acceptors 118, 123, etc. remain ready (internal memory elements are not full), the data source repeatedly sends data by placing new data on the bus, asserting DAV true (low) for a period determined by delay elements 103 and 104 and then asserting DAV false for a period determined by delay elements 103, 104 and 105. If an acceptor 118 becomes not ready, the DAV false period is extended until all acceptors become ready again.

The time periods for delay elements 103, 104, and 105 may be chosen in an implementation based on the desired maximum cable length for the data transfer system, and the known cable characteristics as given in the IEEE-488 standard. For example, if all three delay elements are 50 nsec, time period $t_0$, 51 would be 100 nsec, and time period $t_2$, 59, would be 150 nsec.

A more sophisticated implementation circuit would have additional delay elements and logic means of selecting the desired $t_0$ and $t_2$ values by enabling and disabling the decoding of the delay elements. This would allow the time periods to be set by switches or computer software control based on knowledge of the system cable lengths. Such a circuit would also fall within the scope of this invention.

This handshake configuration eliminates the DAC signal from the prior art method entirely and eliminates the requirements for transitions of the RFD signal on every data byte transferred. Because RFD low to high transitions are achieved by a passive pullup resistor on a cable of significant capacitance, such transitions in the prior art are slow. The instant invention can thus achieve significantly higher data transfer rates while maintaining compatibility with existing cables and connectors. Moreover, any one acceptor 118, 123 can still signal that it is busy and is unable to accept additional data bytes. Therefore, the benefit of the prior art handshaking routine is retained.

Figure 4:
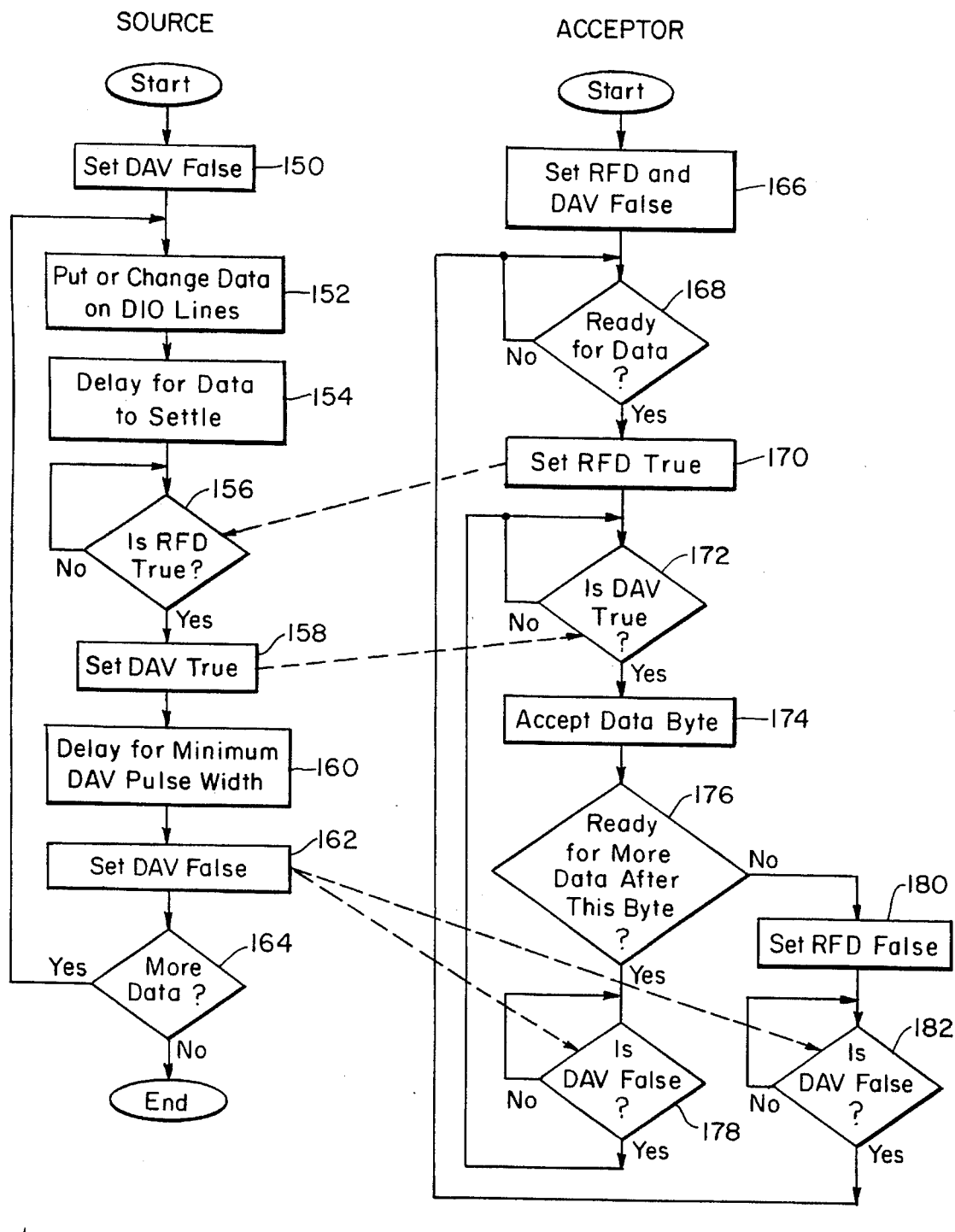
FIG. 4 is a flow chart showing the operating states of the data source and the data acceptors according to the present invention.

Transfer of a typical data byte, begins when the source places a new data value on the data signal lines, step 152, FIG. 4. Initialization sets DAV false, step 150. After waiting for a data settling delay period, step 154, and RFD to be true, step 156, the source indicates DAV true, step 158, causing the acceptors to receive the data within the minimum delay time period, step 160, and the acceptors are required to complete acceptance within a time period shorter than the minimum allowed DAV true as discussed above. After waiting for a selected data transmission period, the source indicates DAV false, step 162, and then is free to repeat the cycle, step 164. Contrary to the prior art devices, RFD is not set from true to false on each successive transfer by the receptors nor does a DAC signal go from low to high during the transfer of each data byte.

Initialization of the acceptors sets RFD false, step 166 and if each acceptor is ready for data, step 168, RFD is set true, step 170 which in turn is noted by the source at step 156. If DAV is true, step 172, the current data byte is accepted, step 174, and if all the acceptors are ready for more data bytes, step 176, and DAV is false, step 178, the process repeats/ Yom step 172. If one or more acceptors are not ready for more data bytes, RFD is set false, step 180, and after DAV is set false, step 182, processing continues from step 168.

Should one or more acceptors indicate they are not ready for more data, and thus must delay the transfer of further successive data bytes, the process is as follows. The source places a new data value on the signal line, step 152, and waits a short time for settling, step 154. RFD is true, step 156, so DAV is set true, step 158. DAV is held true for the minimum DAV pulse width 160 ($t_0$, 51, FIG. 2). During this time, one or more acceptors may set RFD false indicating they will require additional time before being ready to accept any further data bytes. The current data byte is still accepted by all acceptors within the required time period and thereafter DAV is set false, step 162, FIG. 4. The source places another new data value on the signal lines, step 152; but since RFD is now false, step 156, DAV is not yet set true for the predetermined time period. On the acceptor side, RFD was set false at step 180 and since DAV is false, processing continues to step 168 where RFD is not set true, step 170, until each acceptor is ready for data after there is sufficient room in memory in the acceptor which has driven RFD false, step 180. Once all the acceptors are ready for data, step 168, RFD is set true, step 170. Now, since RFD is true at step 156, on the source side, DAV is set true for the minimum DAV pulse width, step 160, and processing continues as described above.

Figure 5:
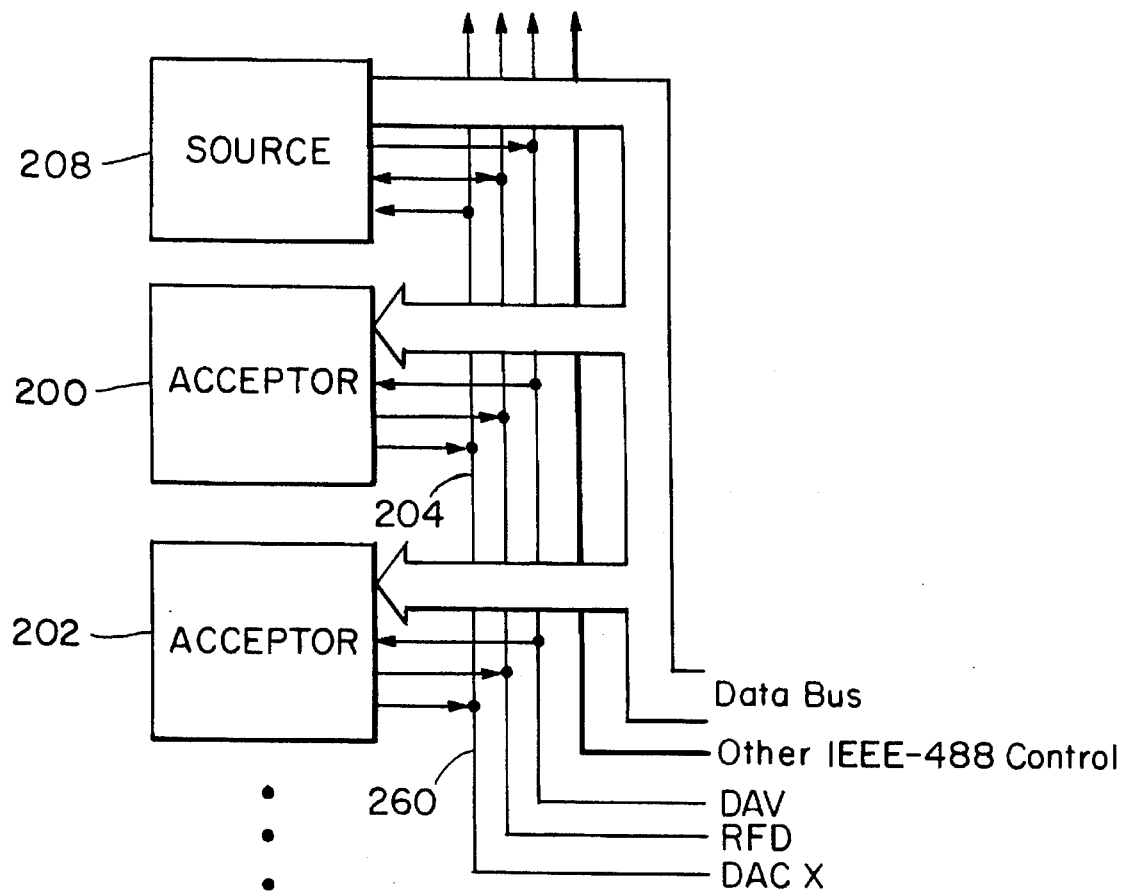
FIG. 5 is a schematic block diagram of an embodiment of the present invention.

Although this invention features a high speed data transfer system in which a DAC signal is not required, each acceptor, 200, 202, FIG. 5 may still include output lines 204, 206 respectively, for sending a DAC signal so that reconfiguration of current acceptor devices 200, 202 and source 208 is not required. In fact, the source and acceptor handshake interface functions according to this invention may support two different handshake sequences: three wire handshake as described in the prior art, and the more streamlined data handshake which allows multiple data bytes to be sourced without waiting for transitions of RFD and DAC signals, as described above.

Although specific features of the invention are shown in some drawings and not others, this is for convenience only as some feature may be combined with any or all of the other features in accordance with the invention.

For example, other features that may be included in an embodiment of this invention include hardware or software selectable choices for time periods $t_0$, 51, and $t_2$, 59, in the source logic circuit; source and acceptor circuitry which can operate in either the method of this invention or the method of the prior art IEEE-488 handshake, based on the setting of a logic storage element under hardware or software control.

Also, the meaning of RFD may be modified slightly to allow a fixed number of additional data bytes to be sent by the source after RFD becomes low. Acceptors would use RFD to mean "unable to accept more than n bytes at full speed", instead of "unable to accept any more bytes at full speed (busy)". This would allow the time constraint of $t_1$+cable delays<$t_0$+$t_2$ to be relaxed to $t_1$+cable delays<a multiple of $t_0$+$t_2$.

Other embodiments will occur to those skilled in the art and are within the following claims:

What is claimed is:

1. A high speed data transfer system comprising:

source means of data signals including means for storing data signals to be transferred;

a plurality of data receivers for operating on applied data signals from said source means including means to produce a first output indication of the operability thereof on applied data signals and means for providing a second output indication of the inoperability thereof on applied data signals;

means for coupling data signals from said source means to each of said data receivers; means for producing a third output indication, for a fixed period of time, of the availability of data signals from the source; and means for delaying said means for producing a third output indication, upon the appearance of said second output indication until the appearance of said first output indication.

2. The high speed data transfer system of claim 1 in which said fixed period of time is a function of the time required for a said data receiver to provide said second output indication of the inoperability thereof on applied data signals.

3. The high speed data transfer system of claim 1 in which said fixed period of time is a function of any delay in said means for coupling data signals from said source means to each of said data receivers.

4. A high speed data transfer system for a source which transfers successive data bytes and receiver means which accept the data bytes comprising:

means for indicating to the receiver means a data available signal having two states, a first state indicating the presence of a data byte for transfer from the source, and a second state indicating the unavailability of a data byte for transfer from the source;

means for indicating to the source, a request for data signal having two states, a first state indicating the ability to accept a data byte from the source, and a second state indicating the inability to accept a data byte from the source including means for changing from said first state to said second state within a first time period;

logic means for placing said data available signal in said first state indicating the presence of a data byte for transfer from the source for a second time period greater than said first time period; and said logic means adapted to receive said request for data signal, and upon receipt of a request for data signal in the second state, for holding said data available signal in said second state until the receipt of a said request for data signal in the first state.

5. The high speed data transfer system of claim 4 in which said logic means includes delay means for holding said data available signal in said first state for said second time period.

6. A high speed data transfer process comprising:

providing data signals from a source means to a plurality of data receivers for operating on said applied data signals from the source;

producing a first output indication of the operability thereof of said data receivers on applied data signals from the source and providing a second output indication of the inoperability thereof on applied data signals if a said receiver cannot accept additional data signals;

coupling data signals from the source means to each of the data receivers;

producing a third output indication, for a fixed period of time, of the availability of data signals from the source; and delaying the production of said third output indication, upon the appearance of said second output indication until the appearance of said first output indication.

7. A high speed data transfer process for a source which transfers successive data bytes and receivers which accepts the data bytes comprising:

indicating to the receivers, a data available signal having two states, a first state indicating the presence of a data byte for transfer from the source, and a second state indicating the unavailability of a data byte for transfer from the source;

indicating to the source, a request for data signal having two states, a first state indicating the ability to accept a data byte from the source, and a second state indicating the inability to accept a data byte from the source and changing from said first state to said second state within a first time period;

placing the data available signal in the first state indicating the presence of a data byte for transfer from the source for a second time period greater than the first time period; and holding the data available signal in the second state upon receipt of a request for a data signal in the second state until receipt of a request for data signal in the first state.

* * * * *